Aug. 3, 1954 D. HVISTENDAHL 2,685,149

MACHINE FOR TRIPPING AND POLLENATING ALFALFA

Filed Aug. 18, 1952 3 Sheets-Sheet 1

Dale Hvistendahl
INVENTOR.

BY Clarence A. O'Brien
and Harvey B. Jacobson
Attorneys

Aug. 3, 1954 D. HVISTENDAHL 2,685,149

MACHINE FOR TRIPPING AND POLLENATING ALFALFA

Filed Aug. 18, 1952

Dale Hvistendahl
INVENTOR.

BY Clarence A. O'Brien
and Harvey B. Jacobson
Attorneys

Aug. 3, 1954 D. HVISTENDAHL 2,685,149

MACHINE FOR TRIPPING AND POLLENATING ALFALFA

Filed Aug. 18, 1952 3 Sheets-Sheet 3

Dale Hvistendahl
INVENTOR.

BY Clarence A. O'Brien
and Harvey B. Jacobson
Attorneys

Patented Aug. 3, 1954

2,685,149

UNITED STATES PATENT OFFICE 2,685,149

MACHINE FOR TRIPPING AND POLLENATING ALFALFA

Dale Hvistendahl, Worthington, Minn.

Application August 18, 1952, Serial No. 304,951

12 Claims. (Cl. 47—1)

1

This invention relates to new and useful improvements in pollenating apparatus for seed plants and the primary object of the present invention is to provide a portable machine for tripping and pollenating seed plants, such as alfalfa and the like.

Another important object of the present invention is to provide a machine for tripping and pollenating seed plants including power driven pressure rollers which will engage and compress seed plants or blossoms whereby the pollen may be collected in a chamber at the rear of the rollers.

Yet another object of the present invention is to provide a machine for tripping and pollenating seed plants, such as alfalfa, including air impelling means which will direct streams of air to pollenate the seed plants by directing the air streams onto the blossoms.

A further object of the present invention is to provide a pollenating apparatus of the aforementioned character including means for heating the air as it is directed into a pollen chamber to bring the pollen up to the temperature where it can become air-borne.

A still further aim of the present invention is to provide a machine for tripping and pollenating seed plants, such as alfalfa, that is extremely simple and practical in construction, strong and reliable in use, efficient and durable in operation, inexpensive to manufacture, service and maintain, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, in which:

Figure 1:
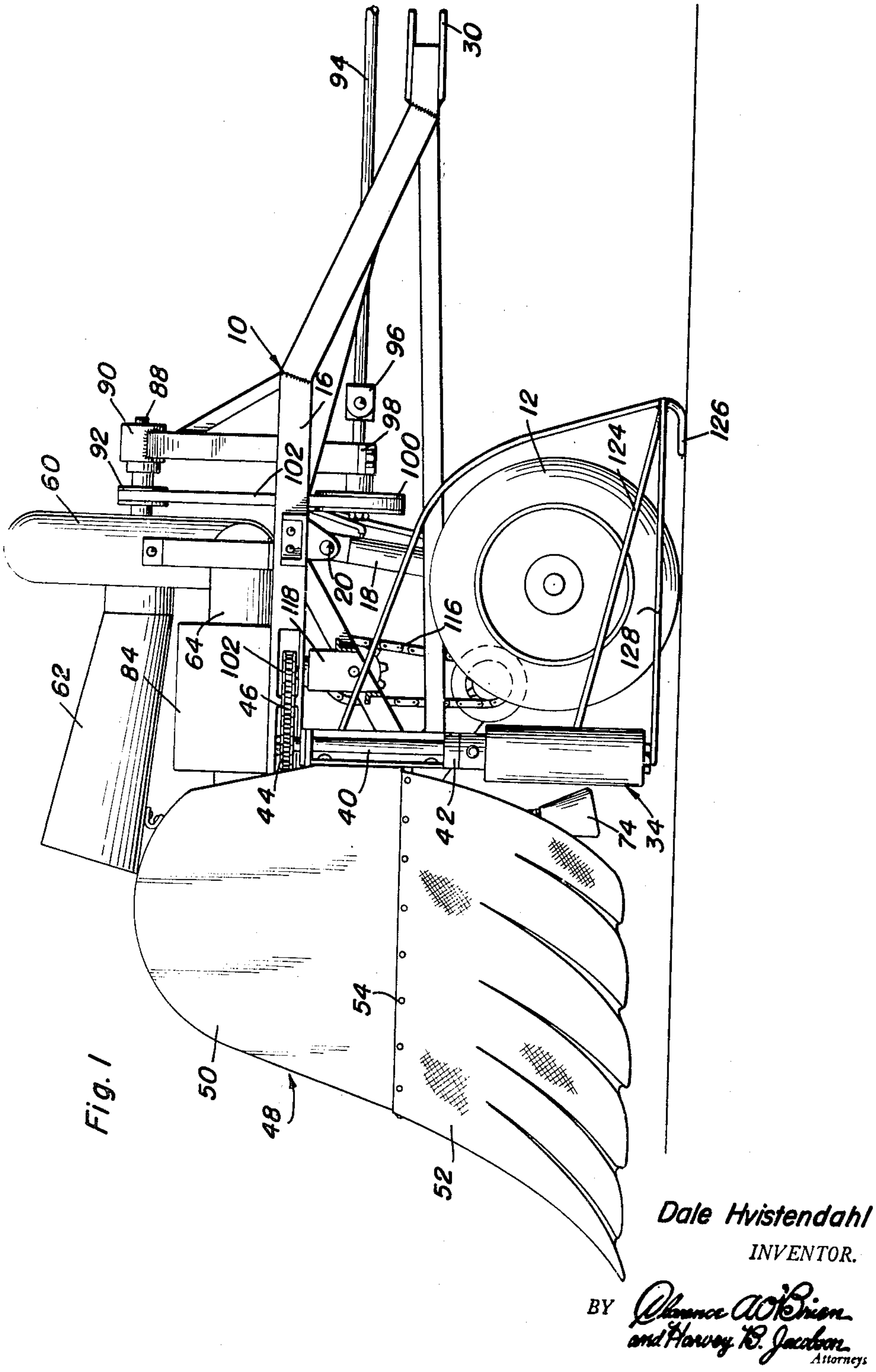
Figure 1 is a side elevational view of the present invention.

Referring now to the drawings in detail, where-

2 in for the purpose of illustration, there is disclosed a preferred embodiment of the present invention, the numeral 10 represents a rigid frame having supporting wheels whose axles 14 are connected to upper frame members 16 of the frame by fluid actuated cylinders 18. The closed ends of the cylinders 18 are pivoted, as at 20, to frame members 16 and the piston rods 22 of the cylinders 18 are pivotally attached to the axles 14. Horizontal pivot fasteners 24, supported by brackets 26 on the frame 10 behind the wheels 12, are connected to the axles 14 by a pitman or links 28 and in such a manner that the frame may be moved upwardly and downwardly with respect to the wheels 12.

The forward end of the frame 10 supports a hitch or yoke 30 capable of being coupled to the drawbar D of a towing vehicle, such as a tractor T, by a coupling pin P. The fluid inlet and outlet lines 32 of the cylinders 18 are intended to be coupled to the fluid pressure lines L of the tractor T by a coupling, such as C, whereby the piston rods 22 may be extended from or retracted into the cylinders 18 for the purpose of raising or lowering the frame 10 relative to wheels 12, by the usual fluid pressure control valve (not shown) on the tractor.

Horizontally spaced pairs of vertical rollers 34 are rotatably supported by the rear end portion of frame 10. Each of the rollers 34 includes a rigid preferably metallic core 36 having a soft rubber covering 38. The cores 36 are formed with axial bores in which vertical shafts 40 are suitably fixed. The upper end portions of shafts 40 extend through suitable bearings 42 on the frame 10 and fixedly support sprockets 44 which are operatively connected to a power driven sprocket chain 46 in a manner presently to be described.

A pollenating chamber 48 is supported by the rear end of the frame 10 behind the rollers 34 and includes an upper rigid, concavo-convexed section 50 and a flexible lower skirt section 52. The upper edge of the section 52 overlaps and is secured to the lower edge of the section 50 by fasteners 54. The section 50 is attached and braced to the frame 10 by suitable means such as supporting bars 56 and mounting brackets 58 to retain the chamber 48 rigidly supported at the rear of the frame.

Means is provided for supplying air into the chamber 48 for scattering and drying pollen entering chamber 48. This means comprises an air impeller or blower 60 that is suitably mounted on the frame and which includes rearwardly extending inlet and outlet ends 62 and 64. The inlet end 62 is disposed above the section 50 whereas the outlet end 64 extends into the chamber 48 where it is suitably coupled to the central portion of a horizontal spray head or tube 66 to supply air under pressure to the tube 66. The tube 66 is horizontally supported on frame 10 by suitable means such as clamp bracket 68 and its ends are closed so that air entering the tube 66 will pass through rearwardly extending longitudinally spaced horizontal nipples on the tube 66 and longitudinally spaced depending nipples 72 on the tube 66.

Clamps 74 at the upper ends of flexible conduits 76 are clamped over the nipples 72 and sidewardly facing outlet heads 78 at the lower ends of conduits 76 are disposed behind the rollers 34 to circulate pollen passing between the rollers 34 as air is impelled by a blower 60.

Hanger rods 80 are pivotally and adjustably attached at their upper ends to the tube 66 by brackets, such as 68, and the lower ends of the rods 80 are pivotally and removably secured to clamp portion 82 of heads 78 so that the heads 78 may be adjusted relative to the rollers and to each other.

In order that the air entering the chamber 48 will be heated to effectively dry pollen in chamber 48 so that the pollen will be air-borne, a suitable heating unit 84 is disposed in the path of the air impelled by the blower. This heating unit may be disposed at the inlet end 62 of the blower 66 or the outlet end thereof and preferably includes gasoline burners (not shown) of known construction that will receive fuel from the tractor by being connected to the fuel supply of the tractor by a conduit 86.

The blade supporting shaft 88 of the impeller 60 is supported by a bearing 90 on the frame 10 and carries a pulley 92 that is operatively connected to a power source, such as the power take-off shaft of the tractor T by a drive shaft 94 whose forward end is coupled to the power take-off shaft. The shaft 94 includes forward and rear sections that are joined by a universal joint 96. The rear section of the shaft 94 is journaled in a bearing 98 on the frame 10 and supports a pulley 100 that is connected to the pulley 92 by an endless pulley belt 102. In this manner, the blower shaft 88 will rotate with the power take-off shaft of the tractor regardless as to the raising and lowering of the frame 10 relative to the wheels 12.

A horizontal shaft 103 is supported in suitable bearings on the frame 10 and is aligned with the fasteners 24. Shaft 103 is disposed behind one of the ground wheels 12 and fixedly supports a sprocket 104 that is connected to a sprocket 106 fixed on the axle of this ground wheel by a sprocket chain 108. Shaft 103 fixedly supports a second sprocket 110 that is connected to a sprocket 112 on a driven shaft 14 by a sprocket chain 116. Shaft 114 is journaled for rotation in bearings on the frame 10 above shaft 102 and is operatively connected through gearing (not shown) in a gear box 118 on frame 10, to a horizontal sprocket 120.

Figure 2:
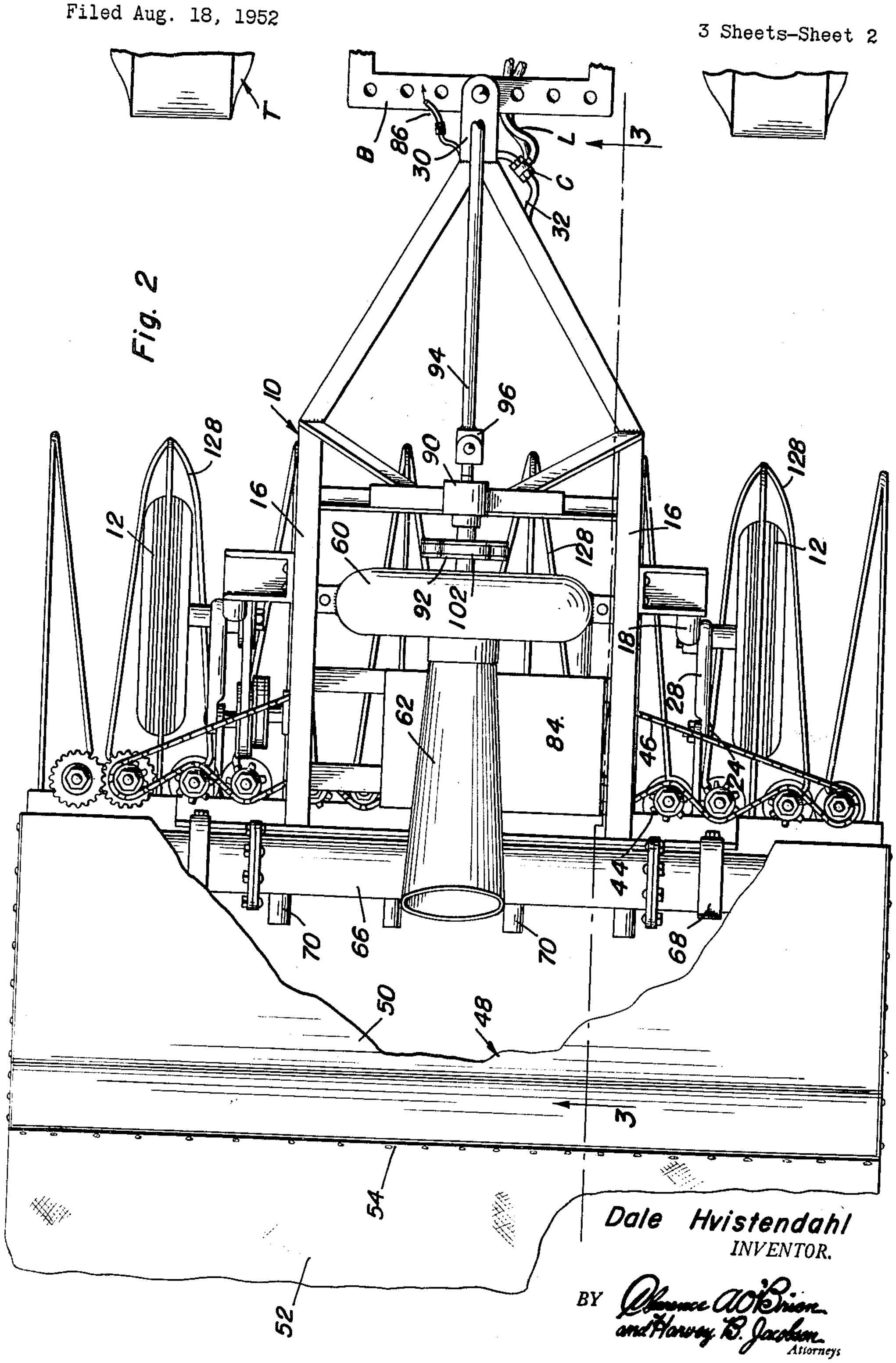
Figure 2 is a top plan view of Figure 1, with part of the pollen chamber broken away, and showing the supporting frame operatively connected to the drawbar of a tractor.
Figures 3, 4, 5:
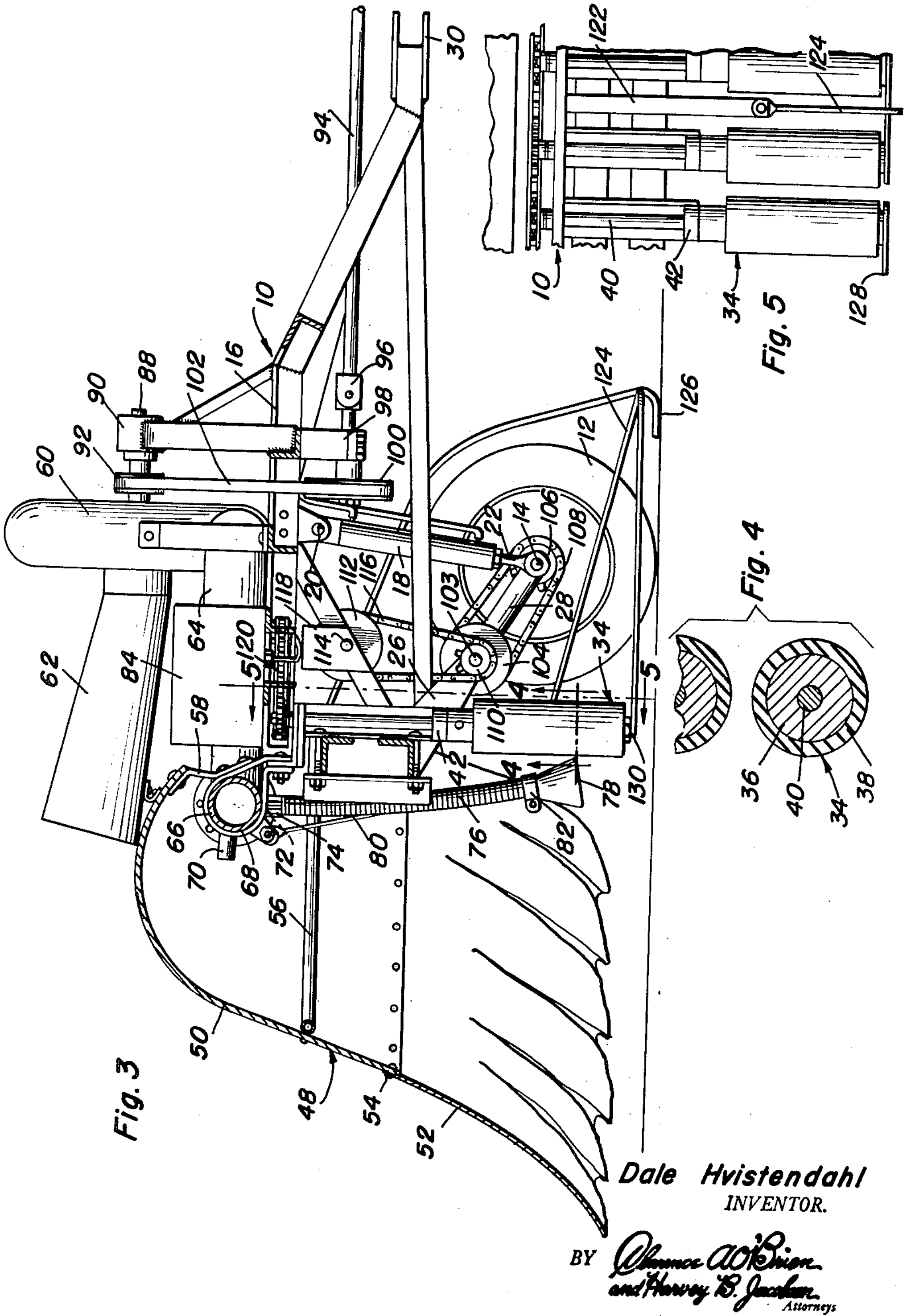
Figure 3 is a longitudinal vertical sectional view taken substantially on the plane of section line 3—3 of Figure 2.
Figure 4 is an enlarged horizontal transverse sectional view taken substantially on the plane of section line 4—4 of Figure 3.
Figure 5 is a fragmentary vertical sectional view taken substantially on the plane of section line 5—5 of Figure 3 to illustrate the roller mounting means and the blossom tripping means.

Sprocket 120 is rotatably supported on the frame 10 and engages chain 46 to drive the latter as the axle of the wheel to which sprocket 106 is attached rotates. Chain 46 engages the sprockets 44 of each roller 34 but is trained behind the sprockets of alternate rollers and in front of the other rollers, as shown in Figure 2, so that the rollers of each pair of rollers will rotate forwardly and inwardly toward each other to engage seed plants and direct blossoms rearwardly.

Means is provided for tripping and guiding blossoms or seed plants. This means consists of a plurality of longitudinal spaced vertical hanger arms 122 that are fixed to the frame 10 between adjacent pairs of rollers 34. The rear ends of downwardly and forwardly inclined resilient arms or rods 124 are fixed to the hanger arms 122 and their forward ends are bent to form ground contacting hooks 126.

V-shaped wire guide elements 128 have their apices fixed to the hooks 126. The rearwardly diverging limbs of the elements 128 extend toward adjacent rollers of adjacent pairs of rollers so that blossoms or seed plants will be guided between pairs of rollers rather than the spaces between adjacent rollers of adjacent pairs of rollers. The rear ends of the elements 128 are curved toward each other and terminate in upwardly extending fingers 130 that enter recesses in the lower ends of roller supporting shafts 40.

Where the element 128 straddles the wheel 12, then the arms 124 for these elements will be bent so as to clear the wheels 12.

Although the wheel mounting means in conjunction with the frame 10 will permit the frame to be raised so that the rollers 34 are capable of engaging blossoms disposed at a predetermined height above the ground surface, thereby establishing additional utility for the device, it is anticipated that the frame 10 may be fixedly attached to the rear portion of a towing vehicle or tractor thereby avoiding the necessity of providing the supporting wheels 12, in order to reduce manufacturing cost of the apparatus. In the event such a construction is followed, the rollers 34 will be operatively connected to the power take-off shaft of the tractor since the ground wheels of the frame will no longer constitute a drive means for the pressure rollers.

In practical use of the present invention, as the frame 10 is moved forwardly, seed plants and blossoms will be guided between the adjacent limbs of adjacent elements 128 and directed toward the rollers 34. As the blossoms are engaged by the rollers 34, the blossoms will be crushed or pressed so that the pollen may pass rearwardly into the chamber 48. Heated air directed into the chamber 48 and through conduits 76 and nipples 70 will scatter the pollen throughout the chamber 48 while drying the pollen and permitting the pollen to be air-borne. The pollen may then pass from the lower open bottom of the chamber 48.

Having described the invention, what is claimed as new is:

1. A blossom tripping and pollenating machine comprising a frame, pairs of vertically disposed power driven pressure rollers supported on the frame, means supported in front of the rollers for guiding blossoms toward the rollers, an enclosure on the frame behind the rollers for receiving pollen and having an open bottom, and air circulating means including an outlet in communication with the interior of the enclosure.

2. A blossom tripping and pollenating machine comprising a frame, pairs of vertically disposed power driven pressure rollers supported on the frame, means supported in front of the rollers for guiding blossoms toward the rollers, a pollenating chamber behind the rollers to receive pollen as blossoms pass between the rollers, said chamber having an open bottom to permit the passage of pollen therefrom, and air impelling means supported on the frame and including an outlet extending into the chamber to scatter pollen in the chamber.

3. A blossom tripping and pollenating machine comprising a frame, pairs of vertically disposed power driven pressure rollers supported on the frame, means supported in front of the rollers for guiding blossoms toward the rollers, a pollenating chamber behind the rollers to receive pollen as blossoms pass between the rollers, said chamber having an open bottom to permit the passage of pollen therefrom, and air impelling means supported on the frame and including an outlet extending into the chamber to scatter pollen in the chamber, an air heating means in the path of air impelled by said impeller for drying pollen passing between the rollers.

4. A blossom tripping and pollenating machine comprising a frame, pairs of vertically disposed power driven pressure rollers supported on the frame, means supported in front of the rollers for guiding blossoms toward the rollers, an enclosure on the frame behind the rollers for receiving pollen and having an open bottom, and air circulating means including an outlet in communication with the interior of the enclosure, said enclosure including a rigid concavo-convexed section having its concave surface facing the rollers and forming an air deflector.

5. A blossom tripping and pollenating machine comprising a frame, pairs of vertically disposed power driven pressure rollers supported on the frame, means supported in front of the rollers for guiding blossoms toward the rollers, a pollenating chamber behind the rollers to receive pollen as blossoms pass between the rollers, said chamber having an open bottom to permit the passage of pollen therefrom, and air impelling means supported on the frame and including an outlet extending into the chamber to scatter pollen in the chamber, said chamber including a rigid concavo-convexed upper section having its concave surface facing the rollers and having a lower edge lying in a plane above the upper ends of said rollers, said chamber also including a flexible skirt comprising a lower section and attached to said upper section.

6. A blossom tripping and pollenating machine comprising a frame, a plurality of pairs of vertically disposed power driven coacting pressure rollers supported on the frame, a pollenating chamber behind the rollers and having an open bottom, means supported on the frame in front of the rollers for tripping blossoms and guiding the same toward the rollers, a horizontal spray head supported on the frame above and behind the rollers and having outlet means entering the chamber, and air impelling means having an outlet attached to said head for supplying air to the head.

7. A blossom tripping and pollenating machine comprising a frame, a plurality of pairs of vertically disposed power driven coacting pressure rollers supported on the frame, a pollenating chamber behind the rollers and having an open bottom, means supported on the frame in front of the rollers for tripping blossoms and guiding the same toward the rollers, a horizontal spray head supported on the frame above and behind the rollers and having outlet means entering the chamber, and air impelling means having an outlet attached to said head for supplying air to the head, and air heating means at the outlet of said impeller and in the path of air passing through the outlet of said impeller, whereby heated air will pass through the head and into the chamber for drying pollen therein.

8. A blossom tripping and pollenating machine comprising a frame, a plurality of pairs of vertically disposed power driven coacting pressure rollers supported on the frame, a pollenating chamber behind the rollers and having an open bottom, means supported on the frame in front of the rollers for tripping blossoms and guiding the same toward the rollers, a horizontal spray head supported on the frame above and behind the rollers and having outlet means entering the chamber, and means in communication with said head for supplying heated air to the latter.

9. A blossom tripping and pollenating machine comprising a frame, a plurality of pairs of vertically disposed power driven coacting pressure rollers supported on the frame, a pollenating chamber behind the rollers and having an open bottom, means supported on the frame in front of the rollers for tripping blossoms and guiding the same toward the rollers, a horizontal spray head supported on the frame above and behind the rollers and having outlet means entering the chamber, and air impelling means having an outlet attached to said head for supplying air to the head, said tripping and guiding means comprising a plurality of hanger arms fixed to the frame, forwardly and downwardly inclined resilient arms fixed to the hanger arms, and V-shaped wire guide elements having their apices fixed to said resilient arms in front of said rollers, the limbs of said guide elements extending rearwardly from said resilient arms toward adjacent rollers of adjacent pairs of rollers and at the lower ends thereof.

10. A blossom tripping and pollenating machine comprising a frame, a plurality of pairs of vertically disposed power driven coacting pressure rollers supported on the frame, a pollenating chamber behind the rollers and having an open bottom, means supported on the frame in front of the rollers for tripping blossoms and guiding the same toward the rollers, a horizontal spray head supported on the frame above and behind the rollers and having outlet means entering the chamber, and air impelling means having an outlet attached to said head for supplying air to the head, said tripping and guiding means comprisinga plurality of hanger arms fixed to the frame, forwardly and downwardly inclined resilient arms fixed to the hanger arms, and V-shaped wire guide elements having their apices fixed to said resilient arms in front of said rollers, the limbs of said guide elements extending rearwardly from said resilient arms toward adjacent rollers of adjacent pairs of rollers and at the lower ends thereof, said limbs of each of said wire guide elements being bent inwardly toward each other under the rollers.

11. A blossom tripping and pollenating machine comprising a frame, pairs of vertically disposed power driven pressure rollers supported on the frame, means supported in front of the rollers for guiding blossoms toward the rollers, an enclosure on the frame behind the rollers for receiving pollen and having an open bottom, and air circulating means including an outlet in communication with the interior of the enclosure, each of said rollers including a rigid core and a soft rubber covering over the core.

12. A blossom tripping and pollenating machine comprising a frame, a plurality of pairs of vertically disposed power driven coacting pressure rollers supported on the frame, a pollenating chamber behind the rollers and having an open bottom, means supported on the frame in front of the rollers for tripping blossoms and guiding the same toward the rollers, a horizontal spray head supported on the frame above and behind the rollers and having outlet means entering the chamber, and air impelling means having an outlet attached to said head for supplying air to the head, said outlet means of said head including a plurality of longitudinally spaced nipples depending from said head, flexible conduits having upper ends engaged over the nipples and lower ends facing the rollers and disposed therebehind, and supporting rods engaged with the spray head and attached to the lower ends of the flexible conduits.

References Cited in the file of this patent

UNITED STATES PATENTS

| Number | Name | Date |
|---|---|---|
| 966,470 | Philipp | Aug. 9, 1910 |
| 1,528,664 | Ferraguti | Mar. 3, 1925 |
| 1,866,219 | Nielsen | July 5, 1932 |
| 2,029,166 | Hales | Jan. 28, 1936 |
| 2,548,487 | Marchant | Apr. 10, 1951 |
| 2,570,511 | Blair | Oct. 9, 1951 |

FOREIGN PATENTS

| Number | Country | Date |
|---|---|---|
| 601,168 | Great Britain | Apr. 29, 1948 |

OTHER REFERENCES

Barber, Intern. Sugar J. 22, 310 and Plate II (1920).